US012706256B2

(12) United States Patent
Sabale et al.

(10) Patent No.: US 12,706,256 B2
(45) Date of Patent: Aug. 11, 2026

(54) SWITCH DISCONNECTOR WITH AN ARC EXTINGUISHING SHIELD PLATE

(71) Applicant: Eaton Intelligent Power Limited, Dublin (IE)

(72) Inventors: Varsha Sabale, Maharastra (IN); Krzysztof Ryszard Bednarski, Leicestershire (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 252 days.

(21) Appl. No.: 18/579,629

(22) PCT Filed: Aug. 11, 2022

(86) PCT No.: PCT/EP2022/025370
§ 371 (c)(1),
(2) Date: Jan. 16, 2024

(87) PCT Pub. No.: WO2023/020712
PCT Pub. Date: Feb. 23, 2023

(65) Prior Publication Data

US 2024/0312734 A1 Sep. 19, 2024

(30) Foreign Application Priority Data

Aug. 17, 2021 (IN) ............................ 202111037295
Sep. 29, 2021 (GB) ..................................... 2113892

(51) Int. Cl.
*H01H 9/36* (2006.01)

(52) U.S. Cl.
CPC .................................... *H01H 9/36* (2013.01)

(58) Field of Classification Search
CPC .. H01H 9/30; H01H 9/36; H01H 1/64; H01H 77/108; H01H 1/2083; H01H 1/50; H01H 50/00; H01H 9/44; H01H 73/18; H01H 33/18; H01H 9/443; H01H 9/34; H01H 9/446; H01H 9/342; H01H 1/20; H01H 33/187; H01H 33/91; H01H 50/20; H01H 50/54
See application file for complete search history.

(56) References Cited

U.S. PATENT DOCUMENTS 3,170,054 A 2/1965 Lawrence et al.
3,253,092 A * 5/1966 Landow ............. H01H 11/0012 200/16 A (Continued)

FOREIGN PATENT DOCUMENTS

CN 201 311 856 Y 9/2009
DE 44 24 560 A1 1/1996

(Continued)

*Primary Examiner* — Ahmed M Saeed
(74) *Attorney, Agent, or Firm* — LEYDIG, VOIT & MAYER LTD.

(57) ABSTRACT

A switch disconnector comprises an electrical contact system for breaking a circuit connectable to the switch and a ferromagnetic plate being positioned in a predefined distance to the electric contact system, wherein the predefined distance is selected such that the magnetizing force of the ferromagnetic plate on an electric arc occurring between separated contacts of the electric contact system pulls the arc onto the ferromagnetic plate for interruption of the arc.

3 Claims, 7 Drawing Sheets

(56) References Cited

U.S. PATENT DOCUMENTS

| | | | | | |
|---|---|---|---|---|---|
| 3,430,014 | A * | 2/1969 | Boysen | H01H 71/205 | 337/273 |
| 4,634,819 | A * | 1/1987 | Ikeda | H01H 1/2008 | 200/243 |
| 6,194,984 | B1 | 2/2001 | Kappel et al. | | |
| 8,921,728 | B2 * | 12/2014 | Lang | H01H 77/10 | 218/33 |
| 2016/0233039 | A1 * | 8/2016 | Kanematsu | H01H 50/38 | |
| 2020/0411259 | A1 | 12/2020 | Loos et al. | | |

FOREIGN PATENT DOCUMENTS

| | | | |
|---|---|---|---|
| EP | 0 124 621 | A1 | 11/1984 |
| EP | 3766090 | B1 | 5/2023 |
| GB | 1 294 185 | A | 10/1972 |
| GB | 2 585 098 | A | 12/2020 |

* cited by examiner

SWITCH DISCONNECTOR WITH AN ARC EXTINGUISHING SHIELD PLATE

TECHNICAL FIELD

This specification relates to a switch disconnector with an arc extinguishing device.

BACKGROUND

A switch disconnector is used to break an electrical circuit in order to electrically isolate for example an electrical load from an electric energy source for maintenance. Switch disconnectors designed for low voltage (LV) applications and with lower current ampere ranges, for example below 200 amperes, usually do not have an extinguishing chamber for arcs caused when separating the electric contacts of the switch disconnector. When the distance between the separated electric contacts is large enough, normally an arc between the contacts tears off and extinguishes.

Relinquishing the arc extinguishing chamber makes the construction of a switch disconnector simple with less part count. However, if a switch disconnector is needed for high inductive applications (for example, under AC-23/e and AC-3/e utilization categories), the contact system may be insufficient to perform well. Specially at lower currents, the switch disconnector may struggle to quench arcs in 8-12 times rated current make-break operations, for example when the distance between separated electric contacts is not large enough to cause tearing off of an arc. So, an arc may remain at the contact tips for a long time, which may lead to heavy erosion of the electric contacts. Due to this, the switch disconnector may fail to perform its expected performance of providing continuity across all the poles with a minimum watt loss also.

The European patent application EP0124621A1 relates to a switch comprising the following: a fixed contact attached to a fixed contactor; a movable contact attached to a movable contactor so as to face to the fixed contact: a first metal arc-extinguishing plate constituted by a U-shaped upright wall surrounding the fixed contact with an open portion thereof directed toward the end of the fixed contactor; and a second metal arc-extinguishing plate provided parallel to the first metal arc-extinguishing plate on the side thereof further from the contacts, wherein each of the first and second metal arc-extinguishing plates is positioned at predetermined distances from the fixed contactor.

The US patent application U.S. Pat. No. 3,170,054A relates to electric switches, and it more particularly resides in a switch having an improved contact assembly which provides for more effective contact operation and increased contact life.

The British patent application GB1294185A relates to switching devices and more particularly to the details of construction of a movable contact structure and support therefor in an electric switch.

The German patent application DE4424560A1 relates to an electric switch with contact members being spaced apparat and a bridge movable between on and off positions. One or more extinguishing plates are located away from the bridge periphery, preferably in pairs or stacked.

The British patent application GB2585098A relates to a switch-disconnector for opening, or interrupting, a current conduction path. In particular, this relates to a switch-disconnector with current detection for interrupting a current conduction path, optionally for interrupting a current conduction path in dependence on a detected current.

The Chinese utility model CN201311856Y relates to an element of a contactor, in particular to an arc striking component of small-sized alternating current contactor, wherein the arc striking component mainly takes a U shape, a plurality of tooth spaces are arranged on edges of two sides of a vertical end of the U-shaped arc striking component, and neighboring tooth spaces form closed angles. Compared with the prior art, the arc striking component can generate marginal discharge phenomena, and thereby the arc striking effect is better.

SUMMARY

This specification describes a switch disconnector with an arc extinguishing device, which is particularly suitable for LV applications with lower current make break capacities.

According to an aspect of this specification, a switch disconnector is provided, wherein the switch disconnector comprises an electrical contact system for breaking a circuit connectable to the switch disconnector and a ferromagnetic plate being positioned in a predefined distance to the electric contact system, wherein the predefined distance is selected such that the magnetizing force of the ferromagnetic plate on an electric arc occurring between separated contacts of the electric contact system pulls the arc onto the ferromagnetic plate for interruption of the arc. The ferromagnetic plate serves to create a strong magnetic pull-out force on the arc even at lower currents. The predefined distance may additionally be selected so that any hinderance of the movement of contacts of the electric contact system can be avoided. Yet further, the predefined distance may be selected such that a mass and/or gas flow from contacts of the electric contact system to a venting window of the switch disconnector is not hindered.

The ferromagnetic plate may in embodiments of the switch disconnector be arranged in an inclined position such that the each of the separated contacts of the electric contact system comprise nearly the same distance to the plate. This may make support the pulling of the arc onto the plate.

In yet further embodiments of the switch disconnector, the ferromagnetic plate may comprise at least one arm extending from a side of the plate to the electric contact system. The extended arm of the plate may not only concentrate the magnetic flux lines and pull force, but also may improve pulling in the arc column. So, it may help to increase the arc voltage sufficiently by attracting, elongating and cooling the arc. In a specific embodiment, the at least one arm may comprise an edge being inclined such that the distance of the at least one arm to the separated contacts is nearly the same. With the inclined edge of the arm, the effect of the ferromagnetic plate can be yet further adapted to the electric contact system.

In still further embodiments of the switch disconnector, the ferromagnetic plate may comprise at least one protrusion for fixation of the plate within a housing of the switch disconnector. The protrusion may allow to safely fix the plate without any further means such as screws or rivets in for example a housing of the if the switch disconnector. Particularly, when the housing is made of plastics, the protrusion may help to clamp the plate within the housing. Particularly, the assembly of the plate may be press and interference fit in a plastic housing to avoid its misplacement.

In embodiments of the switch disconnector, the ferromagnetic plate may have a thickness being selected to provide a predefined magnetic saturation level at a predefined operating current.

The switch disconnector may in embodiments be designed for applications under AC-23/e and AC-3/e utilization categories. These utilization categories are provided for particularly high inductive loads such as electric motors and, therefore, electric arcs may frequently generate when separating contact of an electric contact system of a switch disconnector designed for application under these utilization categories. Arc extinguishing may thus help to avoid damages of the electric contact system.

In embodiments, the switch disconnector may comprise a housing in which the electric contact system is arranged, wherein the electric contact system comprises a fixed contact and a moving contact and the ferromagnetic plate is positioned with a predefined inclination angle in relation to the moving direction of the moving contact. In a specific embodiment of the switch disconnector, the predefined inclination angle may be within a range from about 0° to about 45°. Through the inclination, it may be effected that the plate and arc column trajectories are nearly parallel to each other which may further result into an evenly distributed pull force on the complete length of an arc column.

The details of one or more embodiments are set forth in the accompanying drawings and the description below. Other features and advantages will be apparent from the description and drawings, and from the claims.

DETAILED DESCRIPTION

Figure 1:
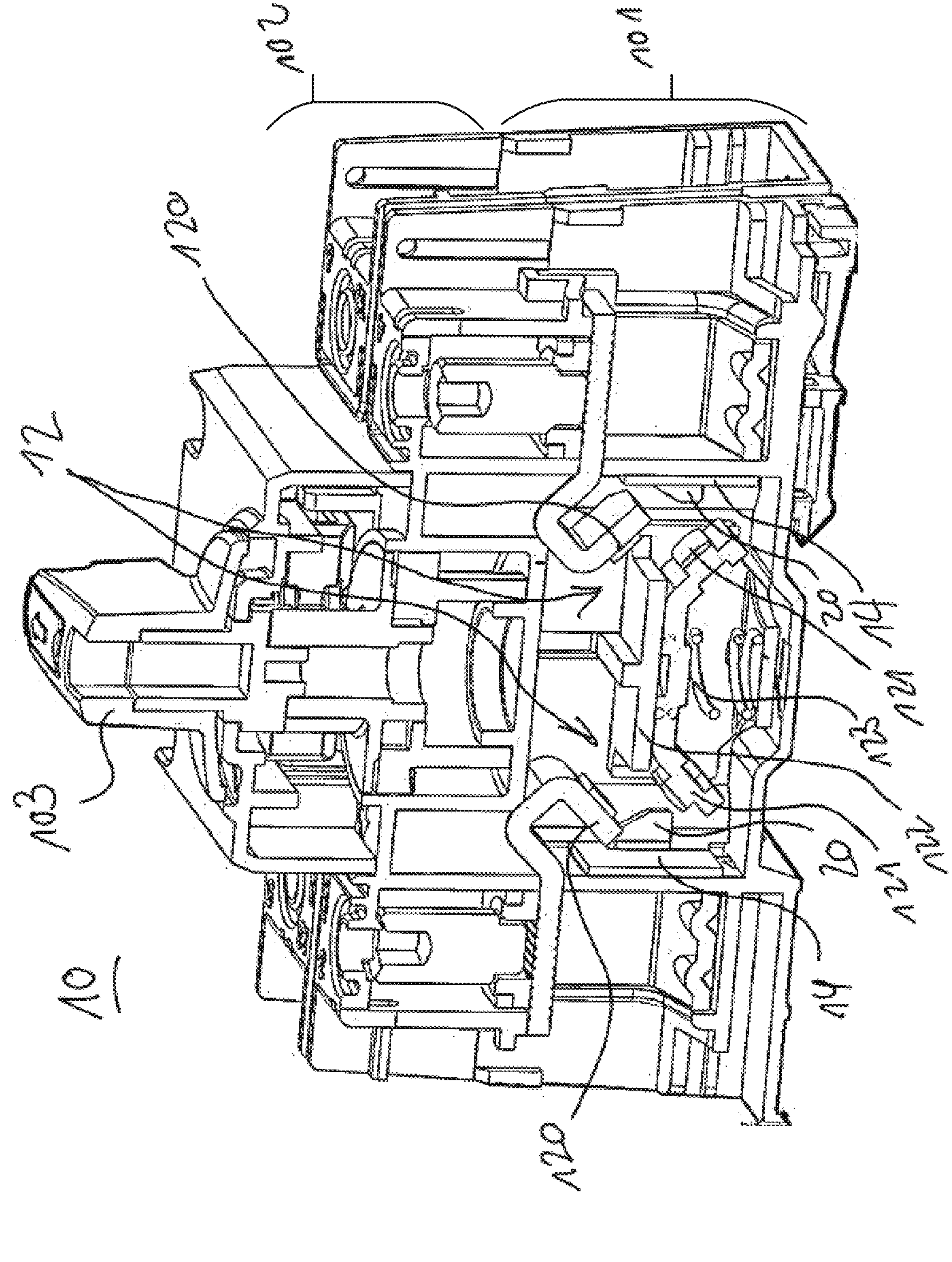
FIG. 1 shows a sectional view of an example of a switch disconnector with a ferromagnetic plate as arc extinguishing device.

In the following, functionally similar or identical elements may have the same reference numerals. Absolute values are shown below by way of example only and should not be construed as limiting.

FIG. 1 shows a sectional view of a switch disconnector 10 for isolating electric loads such as electric motors with a nominal current up to 160 amperes. The disconnector switch 10 comprises a housing having a with a lower part 101 and an upper part 102.

The lower housing part 101 is provided for holding an electric contact system 12 and a ferromagnetic plate 14 as arc extinguishing device. The upper housing part 102 keeps mechanics for moving electric contacts 121 of the electric contact system 12 via a handle 103 seated in a seat of the upper housing part 102.

The electric contact system 12 comprises the movable electric contacts 121 (two as shown in FIG. 1, being electrically connected by a bridging part) and fixed electric contacts 120 (also two as shown in FIG. 1, each provided for electric connection with a circuit to be interrupted with the switch disconnector 10).

Via the handle 103 and the mechanics in the upper housing part 102, a contact mover 122 may be moved vertically downward. The movable electric contacts 121 of the electric contact system 12 are arranged below the contact mover 122.

A spring 123 is positioned between the floor plate of the lower housing part 101 and the movable electric contacts 121 forcing them upwards against the contact mover 122 so that the movable electric contacts 121 can be pressed against the fixed electric contacts 120 of the electric contact system 12 in a position in which the contact mover 122 is not moved downwards by the handle 102 and the mechanics.

When the handle 102 is turned to open the electric contacts 120, 121 of the electric contact system 12 via the mechanics, the contact mover 122 is moved downwards the mechanics. With the contact mover 122 also the movable electric contacts 121 are moved downwards against the force of the spring 123 and are, thus, separated from the fixed electric contacts 120.

The maximum distance between the separated electric contacts 120, 121 is usually large enough to increase the voltage of an electric arc occurring between the separated electric contacts 120, 121 sufficiently by elongating cooling the electric arc.

The ferromagnetic plate 14 is positioned in a predefined distance close to the electric contacts 120, 121. The predefined distance 16 (FIG. 4B, 5B) is selected such that the magnetizing force of the ferromagnetic plate 14 on the electric arc 18 (FIG. 4A, 5A) occurring between separated contacts 120, 121 of the electric contact system 12 pulls the arc 18 onto the ferromagnetic plate 14 for interruption of the arc 18, particularly by increasing the arc length and/or voltage and cooling the arc. It was also detected that the arc resistance can be improved at a middle current range.

Figure 2:
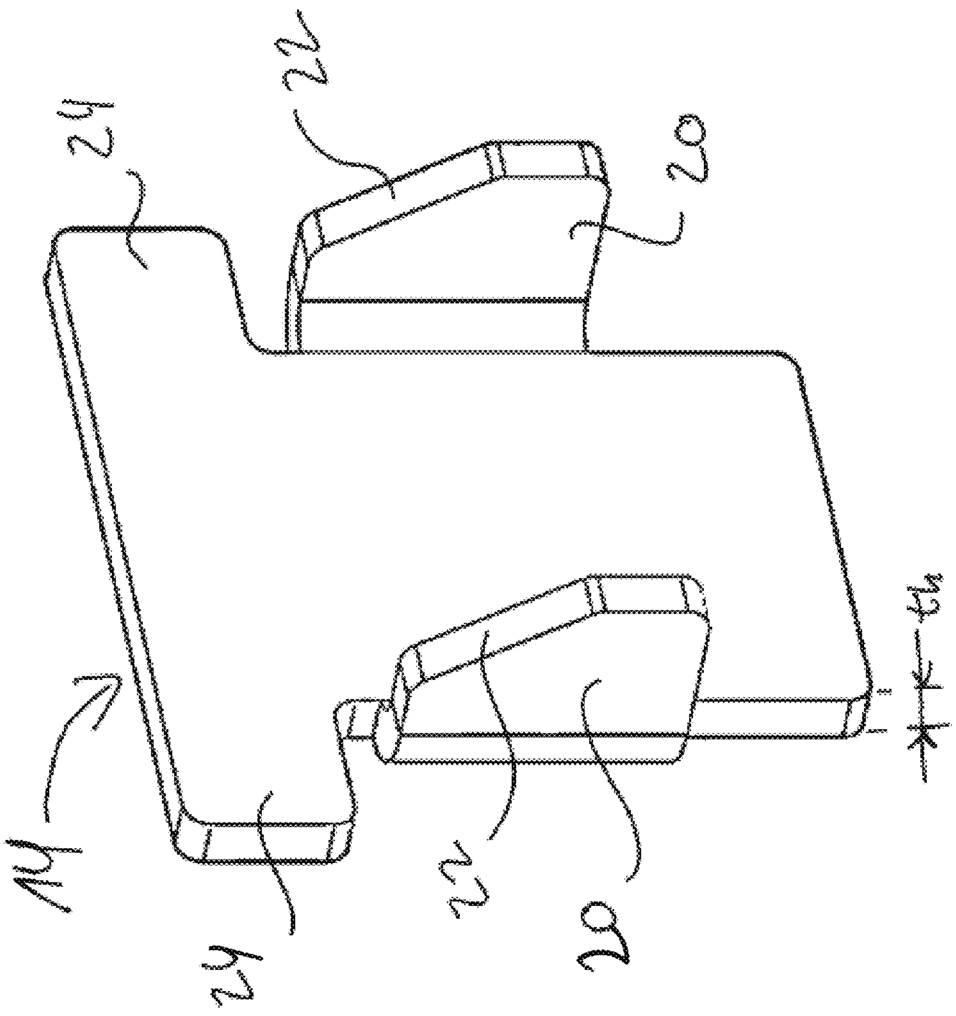
FIG. 2 shows a perspective view of an example of a ferromagnetic plate for a switch disconnector.

FIG. 2 shows a perspective view of an example of the ferromagnetic plate 14 with protrusions 24 for fixation of the plate 14 within a housing of the switch disconnector 10 and arm 20 extending from a side of the plate 14. The arms 20 support pulling an electric arc to the plate 14. Each arm 20 comprises an edge 22 being inclined such that the distance 16 (FIG. 4B, 5B) of the arms 20 to the separated contacts 120, 121 is nearly the same, particularly when the plate 14 is arranged in an inclined position with regard to the moving direction 28 (FIG. 5A, 5B) of the moving contact 121, particularly positioned with a predefined inclination angle 26 in relation to the moving direction 28 of the moving contact 121. The ferromagnetic plate 14 may have a thickness th being selected to provide a predefined magnetic saturation level at a predefined operating current at a predefined operating current. The thickness th may also be selected depending on the space available in the housing of the disconnector switch for the plate 14.

Figure 3:
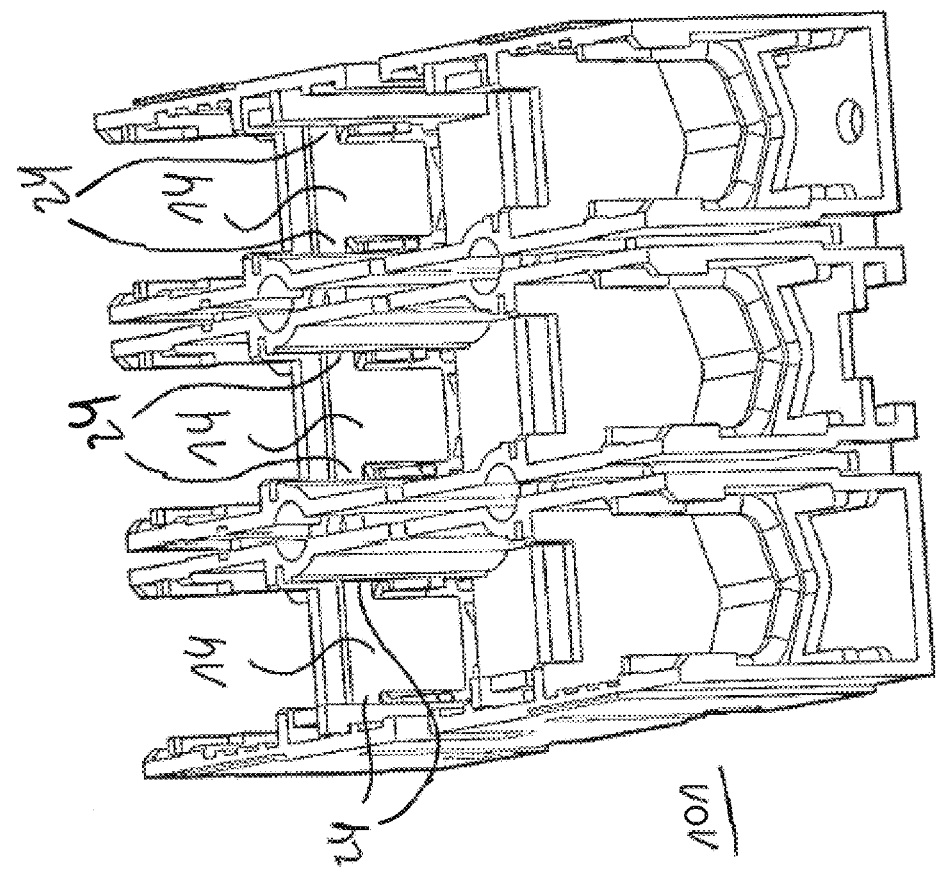
FIG. 3 shows a perspective view of an example of a lower housing part of a switch disconnector with several electrical contact systems and ferromagnetic plates being positioned in a predefined distance to the electric contact systems.

FIG. 3 shows a perspective view of an example of a lower housing part 101 of the switch disconnector 10 with three electrical contact systems and three ferromagnetic plates 14 fixed with the protrusions 24 in the lower housing part 101, which may be made of a plastic, in which the protrusions 24 may be fixed.

Figure 4A:
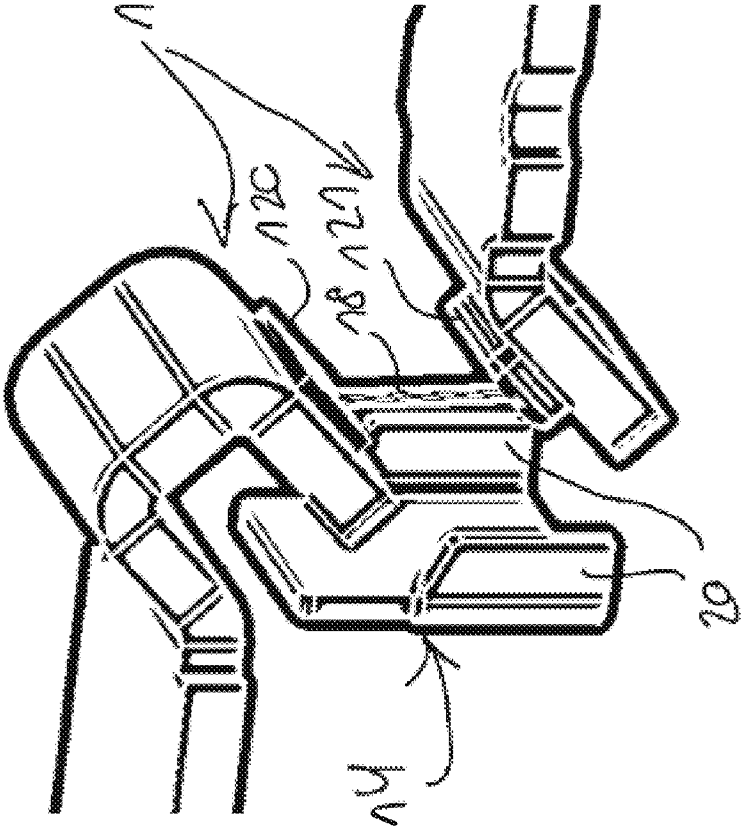
FIGS. 4A and 4B show a perspective view and a side view of an example of an electric contact system of a switch disconnector with a ferromagnetic plate positioned in a predefined distance to the electric contact system according to a first concept.
Figure 4B:
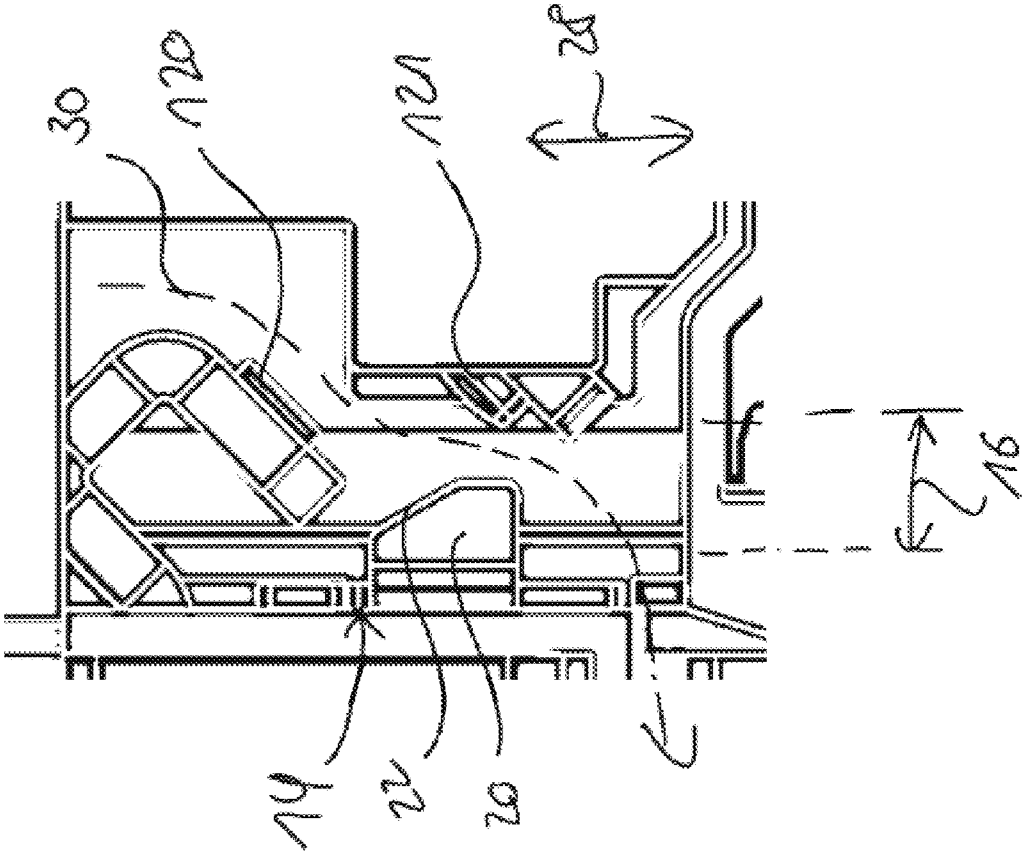

FIGS. 4A and 4B show a perspective view and a side view of an electric contact system 12 of a switch disconnector with a ferromagnetic plate 14 having arms 20 extending from their sides according to a first concept. The plate 14 is positioned in a predefined distance 16 to the electric contact system 12 and arranged nearly parallel to the moving direction 28 of the movable electric contact 121 of the electric contact system 12. The arms 20 are dimensioned such that the deflection of an electric arc 18 occurring between the separated electric contacts 120, 121 is improved, since particularly due to a smaller distance to the inclined edges of the arms 20 the arc 18 can more easily jump over to the extended arms 20 and being split by them. The plate 14 may be also positioned in the housing of the switch disconnector to not obstruct a venting flow 30 as shown in FIG. 4B with the dotted arrow. Analyses carried out with this straight ferromagnetic plate 14 for different load cases of a switch disconnector showed that arc resistance can be increased for all load cases.

Figure 5A:
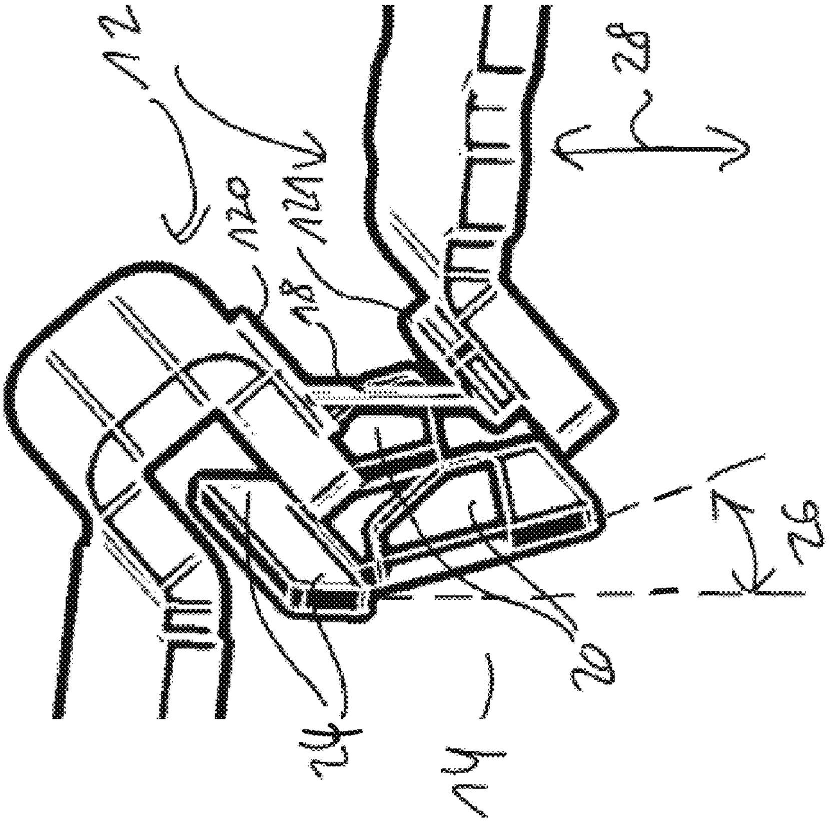
FIGS. 5A and 5B show a perspective view and a side view of an example of an electric contact system of a switch disconnector with a ferromagnetic plate positioned in a predefined distance to the electric contact systems according to a second concept.
Figure 5B:
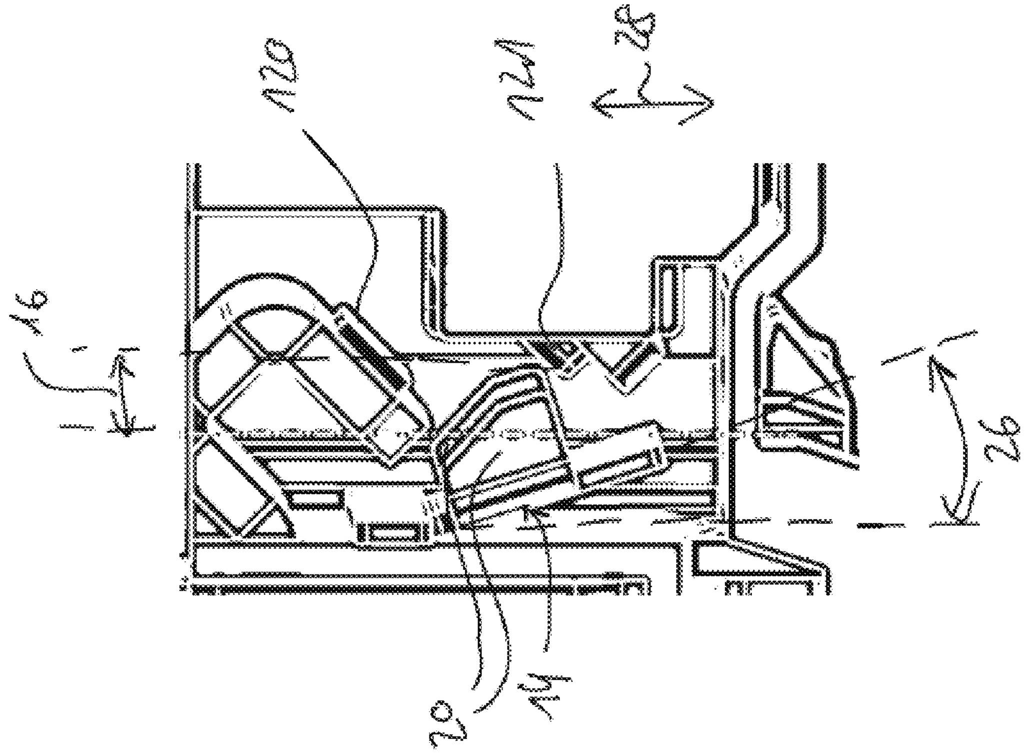

FIGS. 5A and 5B show a perspective view and a side view of an electric contact system 12 of a switch disconnector with a ferromagnetic plate 14 having arms 20 extending from their sides according to a second concept The plate 14 is positioned in a predefined distance 16 to the electric contact system 12 and with a predefined inclination angle 26 to the moving direction 28 of the movable electric contact 121 of the electric contact system 12. The predefined inclination angle 26 may be particularly within a range from about 0° to about 45°, wherein 0° corresponds to the example shown in FIGS. 4A and 4B with a straight ferromagnetic plate 14. The arms 20 are dimensioned such that the deflection of an electric arc 18 occurring between the separated electric contacts 120, 121 is improved, since particularly due to a smaller distance to the inclined edges of the arms 20 the arc 18 can more easily jump over to the extended arms 20 and being split by them. The inclined positioning of the plate 14 with regard to the moving direction 28.

The invention claimed is:

1. A switch disconnector comprising:

an electrical contact system for breaking a circuit connectable to the switch disconnector, the electrical contact system comprising a fixed contact and a moving contact, wherein the fixed contact and the moving contact are inclined with regard to a moving direction of the moving contact of the electrical contact system, and a ferromagnetic plate being positioned substantially parallel to the moving direction of the moving contact and within a predefined distance from the electrical contact system, wherein the ferromagnetic plate comprises at least one arm extending from a side of the ferromagnetic plate towards the electrical contact system, wherein the at least one arm comprises an inclined edge, wherein the predefined distance is selected such that a magnetizing force of the ferromagnetic plate on an electric arc occurring between separated contacts of the electrical contact system pulls the electric arc onto the ferromagnetic plate for interruption of the electric arc.

2. The switch disconnector claim 1, wherein the ferromagnetic plate comprises at least one protrusion for fixation of the ferromagnetic plate within a housing of the switch disconnector.

3. The switch disconnector of claim 1, wherein the ferromagnetic plate has a thickness being selected to provide a predefined magnetic saturation level at a predefined operating current.

* * * * *